United States Patent
Baba (10) Patent No.: US 10,185,886 B2
(45) Date of Patent: Jan. 22, 2019

(54) IMAGE PROCESSING METHOD AND IMAGE PROCESSING APPARATUS

(71) Applicant: FUJITSU LIMITED, Kawasaki-shi, Kanagawa (JP)

(72) Inventor: Kozo Baba, Oita (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/475,355

(22) Filed: Mar. 31, 2017

(65) Prior Publication Data

US 2017/0337445 A1 Nov. 23, 2017

(30) Foreign Application Priority Data

May 20, 2016 (JP) .................. 2016-101943

(51) Int. Cl.
| | | |
|---|---|---|
| G06K 9/32 | (2006.01) | |
| G06K 9/46 | (2006.01) | |
| G06T 7/11 | (2017.01) | |
| G06T 7/73 | (2017.01) | |

(52) U.S. Cl.
CPC ......... *G06K 9/4604* (2013.01); *G06K 9/3258* (2013.01); *G06T 7/11* (2017.01); *G06T 7/73* (2017.01); *G06K 2209/15* (2013.01); *G06T 2207/20081* (2013.01); *G06T 2207/30232* (2013.01); *G06T 2207/30248* (2013.01)

(58) Field of Classification Search
CPC ...... G06T 7/11; G06K 9/3258; G06K 9/4604; G06K 2209/15
See application file for complete search history.

(56) References Cited

U.S. PATENT DOCUMENTS

| | | | | |
|---|---|---|---|---|
| 9,563,814 | B1* | 2/2017 | Wilbert | G06K 9/325 |
| 9,704,201 | B2* | 7/2017 | Bulan | G06Q 40/08 |
| 2008/0166018 | A1* | 7/2008 | Li | G06K 9/00805 |
| | | | | 382/105 |
| 2008/0212837 | A1 | 9/2008 | Matsumoto et al. | |
| 2014/0056520 | A1* | 2/2014 | Rodriguez Serrano | ............ |
| | | | | G06K 9/325 |
| | | | | 382/174 |
| 2014/0072168 | A1* | 3/2014 | Wu | G06K 9/00805 |
| | | | | 382/103 |
| 2017/0300786 | A1* | 10/2017 | Gope | G06K 9/6267 |
| 2017/0357881 | A1* | 12/2017 | Hoshino | G06K 9/80 |

FOREIGN PATENT DOCUMENTS

| | | |
|---|---|---|
| JP | 2003-331384 | 11/2003 |
| JP | 2008-217347 | 9/2008 |

* cited by examiner

*Primary Examiner* — Brenda C Bernardi
(74) *Attorney, Agent, or Firm* — Fujitsu Patent Center (57) ABSTRACT

A method includes obtaining a plurality of images that are continuously captured, detecting a first region indicating a feature value corresponding to a license plate, in a region that indicates a feature value corresponding to a vehicle and that is included in a first image among the plurality of images, based on a feature value of each of the plurality of images, determining a second region in the plurality of images, the second region indicating a feature value corresponding to a license plate, at least a part of the second region overlapping the first region in an image different from the first image, and outputting the second region as a license plate region.

4 Claims, 7 Drawing Sheets

IMAGE PROCESSING METHOD AND IMAGE PROCESSING APPARATUS

CROSS-REFERENCE TO RELATED APPLICATION

This application is based upon and claims the benefit of priority of the prior Japanese Patent Application No. 2016-101943, filed on May 20, 2016, the entire contents of which are incorporated herein by reference.

FIELD

The embodiment discussed herein is related to image processing.

BACKGROUND

Heretofore, there is known a technique of detecting a license plate from an image captured by using a digital camera or the like. In the detection of a license plate, multiple rectangles for license-plate-region candidates are detected from an input image. A License-plate-region candidate is selected from the multiple candidates based on character recognition results and information about the rectangles for the license-plate-region candidates.

For example, Japanese Laid-open Patent Publication No. 2008-217347 and Japanese Laid-open Patent Publication No. 2003-331384 disclose examples of the related art.

SUMMARY

According to an aspect of the invention, a method includes obtaining a plurality of images that are continuously captured, detecting a first region indicating a feature value corresponding to a license plate, in a region that indicates a feature value corresponding to a vehicle and that is included in a first image among the plurality of images, based on a feature value of each of the plurality of images, determining a second region in the plurality of images, the second region indicating a feature value corresponding to a license plate, at least a part of the second region overlapping the first region in an image different from the first image, and outputting the second region as a license plate region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In the above-described related art, it may be difficult to correctly detect a license plate mounted on a vehicle, from an image captured by using a digital camera or the like.

For example, when an image captured by using a digital camera or the like contains an image of a license plate mounted on a vehicle and another image of the license plate which is obtained through reflection on glass, the image of the license plate obtained through reflection on glass may be erroneously detected.

According to one aspect, it is an object of the technique disclosed as an embodiment to avoid erroneous detection of a license plate.

By referring to the drawings, an image processing program, an image processing method, and an image processing apparatus according to embodiments will be described below. In the embodiments, components having identical functions are designated with identical reference characters, and will not be described. The image processing program, the image processing method, and the image processing apparatus described in the embodiments described below are merely examples, and do not limit the embodiments. In addition, the embodiments described below may be combined with one another as long as the resulting combination is consistent.

Figure 1:
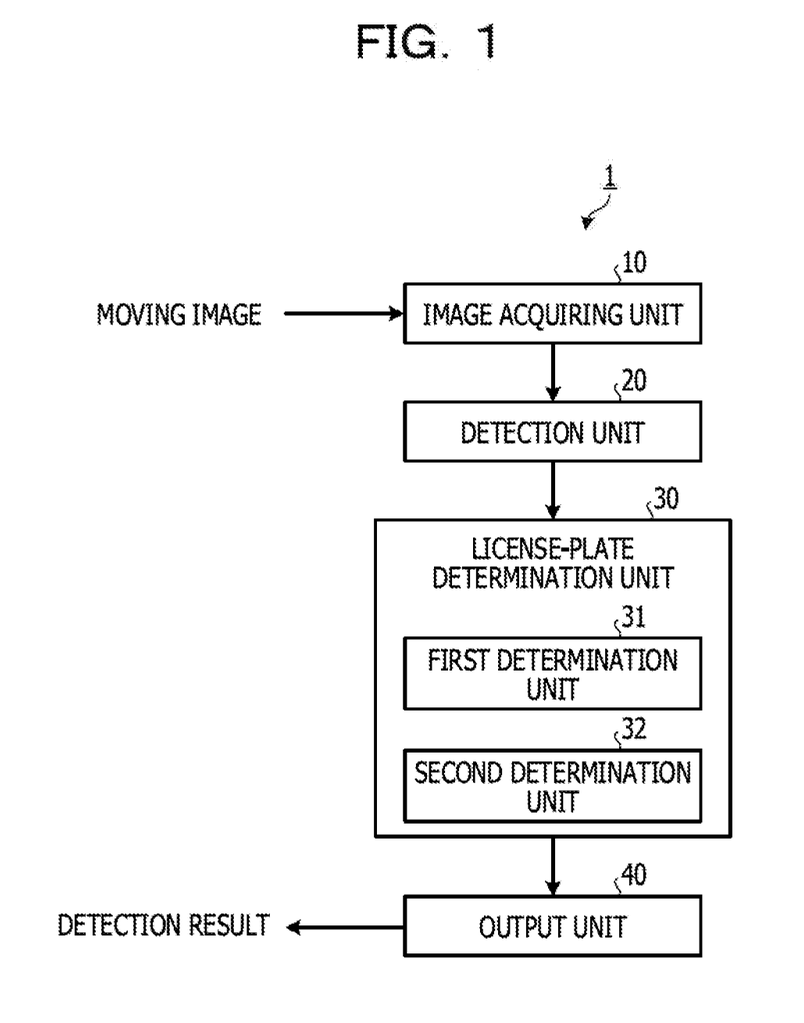
FIG. 1 is a block diagram illustrating an exemplary functional configuration of an image processing apparatus according to an embodiment.

FIG. 1 is a block diagram illustrating an exemplary functional configuration of an image processing apparatus 1 according to an embodiment. As illustrated in FIG. 1, the image processing apparatus 1 is a personal computer (PC), a workstation, or the like which performs processing on a received moving image, and includes an image acquiring unit 10, a detection unit 20, a license-plate determination unit 30, and an output unit 40.

The image acquiring unit 10 is an interface for obtaining data via a storage medium such as a memory card, a communication network, or the like. The image acquiring unit 10 obtains a moving image that contains multiple images from which a license plate is to be detected and which are continuously captured and that is captured at a predetermined frame rate such as 15 fps. The image acquiring unit 10 outputs the obtained moving image to the detection unit 20.

For example, the image acquiring unit 10 obtains a moving image captured by using a fixed point camera installed on a road, via a communication network such as a local area network (LAN). The image acquiring unit 10 also reads, from a storage medium such as a memory card for acquisition, a moving image recorded on the storage medium by using a video recording apparatus (drive recorder) that records a video by using a camera installed in a vehicle. In the embodiment, the image acquiring unit 10 obtains a moving image recorded on a memory card by using a drive recorder.

Based on the feature values (for example, color information, brightness information, and the like) of each of the multiple images (the frames in a moving image) obtained by the image acquiring unit 10, the detection unit 20 detects vehicle regions and license plate regions included in each frame. The detection unit 20 outputs detection results of vehicle regions and license plate regions included in each frame, to the license-plate determination unit 30.

A vehicle region included in a frame is an image region corresponding to a vehicle whose image is captured in the frame, and is, for example, a rectangular region in which an image of the vehicle is present. A license plate region included in a frame is a region (license-plate candidate region) corresponding to a license plate whose image is captured in the frame, and is, for example, a rectangular region that is to be a candidate for a license plate.

As an example, the detection unit 20 discriminates vehicle regions and license plate regions from the frames in a moving image through machine learning using positive images and negative images.

For example, the detection unit 20 is a discriminator that performs machine learning (supervised machine learning) on vehicle images serving as positive images and non-vehicle images serving as negative images, and that detects vehicle regions from the frames in a moving image. Similarly, the detection unit 20 is a discriminator that detects license plate regions from the frames in a moving image through machine learning using license-plate images serving as positive images and non-license-plate images serving as negative images. In the machine learning, for example, histogram of oriented gradients (HOG) feature values are extracted from an image, and learning on vehicles and license plates is performed by using support vector machine (SVM). The detection unit 20 extracts HOG feature values from each frame in a moving image acquired by the image acquiring unit 10, subjects the HOG feature values to the discriminators obtained through machine learning so as to detect vehicle regions and license plate regions.

In the present embodiment, the exemplary method of detecting vehicle regions and license plate regions through machine learning using HOG feature values is described. However, the feature values of an image and the learning method in the above-described example are not limiting. For example, the detection unit 20 may use feature values such as contour information and another learning method (unsupervised machine learning) to detect vehicle regions and license plate regions.

The detection unit 20 also performs an associating operation on the vehicle regions and the license plate regions detected from the frames, based on overlap between regions in frames. For example, the detection unit 20 uses overlap between regions in frames to provide the same identification (such as a vehicle ID) to vehicle regions that overlap each other in frames. The detection unit 20 also uses overlap between regions in frames to provide the same identification (such as a plate ID) to license plate regions that overlap each other in frames.

The license-plate determination unit 30 determines a license plate region that is a detection target and that corresponds to a license plate disposed on a vehicle, from a moving image from which a license plate is to be detected, based on the detection results from the detection unit 20.

For example, the detection results from the detection unit 20 may include not only a license plate disposed on a vehicle but also a license plate reflected on glass, as license plate regions. In particular, unlike a vehicle, a license plate has a simple rectangular shape. Therefore, the detection unit 20 easily detects superfluous license plates, and the detection results may include many erroneous detection results.

Therefore, the license-plate determination unit 30 determines a license plate region that is a detection target and that corresponds to a license plate disposed on a vehicle, from multiple license plate regions detected by the detection unit 20. Thus, even when the detection unit 20 detects superfluous license plate regions, erroneous detection results such as detection of a license plate reflected on glass may be excluded, achieving avoidance of erroneous detection of a license plate.

Specifically, the license-plate determination unit 30 includes a first determination unit 31 and a second determination unit 32. The first determination unit 31 determines license plate regions (first license plate regions) included in detected vehicle regions, among the license plate regions included in the multiple images (the frames in a moving image) acquired by the image acquiring unit 10, based on the detection results from the detection unit 20. Specifically, the license-plate determination unit 30 determines license plate regions that overlie the vehicle regions, among the multiple license plate regions detected by the detection unit 20 in the frames.

Among the license plate regions included in the multiple images (the frames in the moving image) acquired by the image acquiring unit 10, the second determination unit 32 determines license plate regions (second license plate regions) corresponding to the first license plate regions, based on overlap between license plate regions in images (frames) included in the multiple images.

Specifically, among the license plate regions to which plate IDs are provided in frames, the second determination unit 32 determines second license plate regions corresponding to the license plate regions overlying vehicle regions in frames, that is, the first license plate regions determined by the first determination unit 31, based on the detection results from the detection unit 20.

For example, a license plate region that is included in a vehicle region and that is detected in a moving image may be presumed to be a region corresponding to a license plate disposed on a vehicle. In addition, it is presumed that license plate regions to which a plate ID is provided based on overlap between license plate regions in frames correspond to the same license plate for which images are captured in frames in a moving image. Therefore, license plate regions overlying vehicle regions in frames are determined among the license plate regions to which a plate ID is provided. Thus, erroneous detection results for a license plate reflected on glass and the like may be excluded, achieving avoidance of erroneous detection of a license plate.

The license-plate determination unit 30 outputs the determined first license plate regions and second license plate regions as valid license plate regions that are detection targets and that correspond to a license plate disposed on a vehicle, to the output unit 40. Specifically, the license-plate determination unit 30 outputs the plate IDs indicating the valid license plate regions, position information of the regions in the moving image, and the like, to the output unit 40.

The output unit 40 outputs data that is output from the license-plate determination unit 30, as a detection result to the outside. For example, the output unit 40 outputs the detection result to a graphical interface (GUI) for displaying a moving image, or the like. Thus, the GUI may display the detection result on the moving image.

Figure 2:
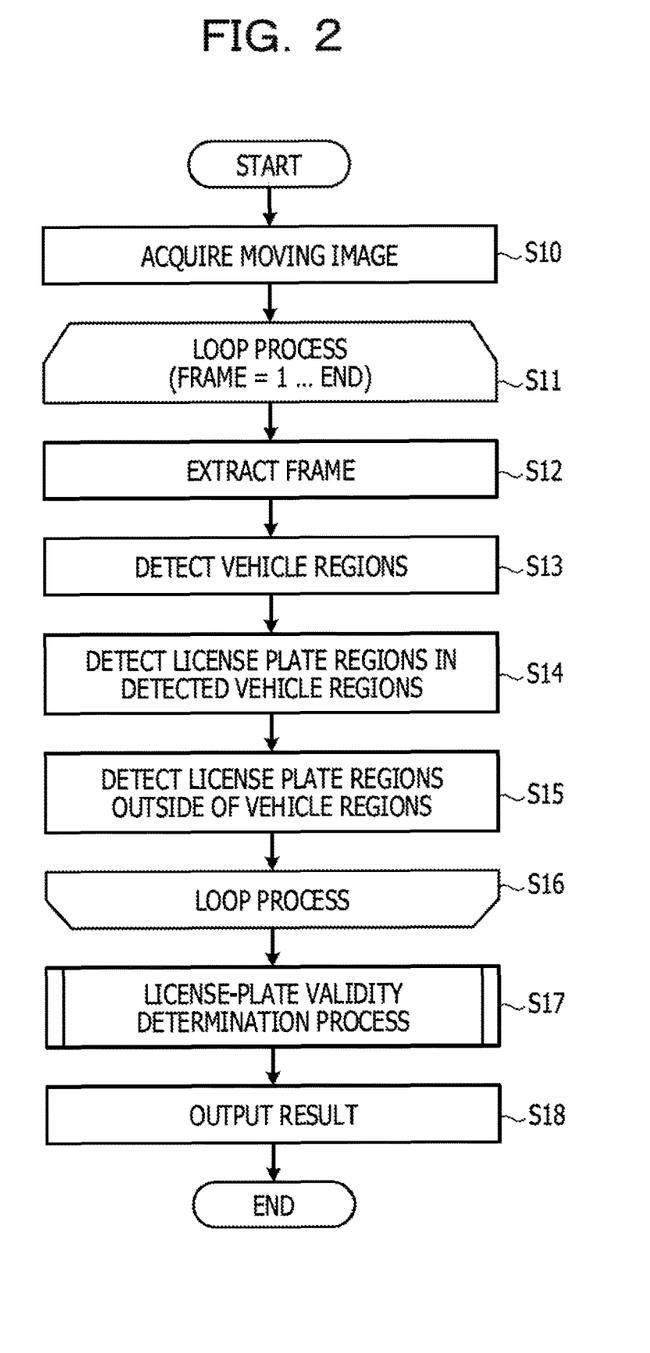
FIG. 2 is a flowchart illustrating exemplary operations performed by the image processing apparatus according to the embodiment.

The details of processes performed by the image processing apparatus 1 will be described. FIG. 2 is a flowchart illustrating exemplary operations performed by the image processing apparatus 1 according to the embodiment.

As illustrated in FIG. 2, when the process starts, the image acquiring unit 10, for example, reads a memory card of a drive recorder, and acquires a moving image from which license plates are to be detected (S10).

Then, the detection unit 20 performs a loop process (S11 to S16) on each frame (frame=1 . . . END) in the moving image, and detects vehicle regions and license plate regions included in each frame.

When the loop process (S11 to S16) is started, the detection unit 20 extracts a frame on which a detection operation is to be performed, from the moving image (S12), and detects vehicle regions from the extracted frame (S13).

The detection unit 20 detects license plate regions from the extracted frame (S14 and S15). Specifically, the detection unit 20 detects license plate regions in the detected vehicles (vehicle regions) obtained in S13 (S14).

At that time, when multiple license plate regions are detected, the detection unit 20 narrows the detected license plate regions to one region corresponding to a license plate mounted on a vehicle. Specifically, the detection unit 20 uses a line segment detector (LSD) to detect line segments from the image. Then, the detection unit 20 leaves line segments whose angles are about 0° or 90°, and generates a binary-data image. Subsequently, the detection unit 20 excludes regions for which no binary-data images are present, among the multiple license plate regions detected in the vehicle region.

For each of the detected license plate regions, the detection unit 20 obtains a score that is a score (for example, weights in SVM detection) corresponding to the feature values of the region and that indicates how much the region is presumed to be a license plate, and narrows the regions to a region having the highest score.

For example, for each of the detected license plate regions, the detection unit 20 adds the score of the region for the pixels in the region. When multiple regions overlap one another, the resulting scores obtained through addition for the pixels become higher. Then, the detection unit 20 obtains the average of the resulting scores in the detected license plate region, as a region score corresponding to the region. Then, the detection unit 20 excludes license plate regions having region scores equal to or less than a predetermined threshold, and narrows the regions to a region having the highest region score among the remaining license plate regions. When regions have the same region score, the detection unit 20 selects an OR region of the regions.

Figure 3:
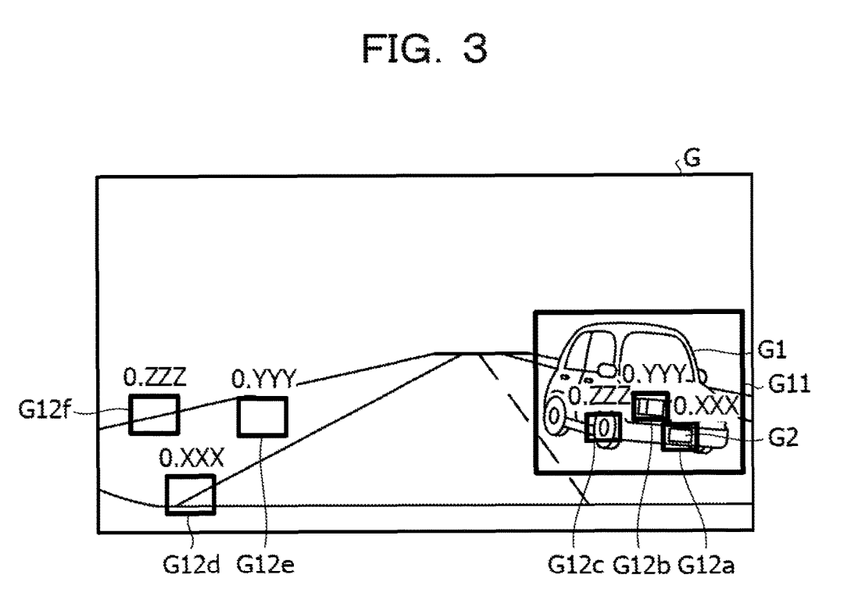
FIG. 3 is a diagram for describing an exemplary moving image.

FIG. 3 is a diagram for describing an exemplary moving image. As illustrated in FIG. 3, in a moving image G, an image of a vehicle G1 on which a license plate G2 is mounted is captured. The detection unit 20 detects a vehicle region G11 corresponding to the vehicle G1 in the moving image G. The detection unit 20 also detects license plate regions G12a to G12c in the vehicle region G11. Among the license plate regions G12a to G12c, the license plate region G12a is a region corresponding to the license plate G2, and the license plate regions G12b and G12c are superfluously detected regions. In addition, the license plate regions G12a, G12b, and G12c have scores of "0.XXX", "0.YYY", and "0.ZZZ", respectively, and have a relationship, "0.XXX">"0.YYY">"0.ZZZ".

The detection unit 20 may exclude the license plate region G12c that is positioned near a tire of the vehicle G1 through the narrowing using line-segment detection. In addition, the detection unit 20 may narrow the regions to the license plate region G12a having the highest score, through the narrowing using scores.

Returning back to FIG. 2, subsequently to S14, the detection unit 20 detects license plate regions outside of the vehicles (vehicle regions) detected in S13 (S15). In detection of license plates in S15, the narrowing using line-segment detection is performed. Thus, as illustrated in FIG. 3, license plate regions G12d to G12f are detected.

In the example in FIG. 3, the license plate regions G12d to G12f are superfluous regions detected, for example, due to a license plate reflected on a windshield or the like. In detection of license plate regions outside of vehicle regions, a license plate region corresponding to a license plate of a vehicle that is out of frame may be detected. Therefore, in S15, narrowing to one region using scores is not performed (However, regions having scores equal to or less than a predetermined threshold may be excluded).

The detection unit 20 performs the above-described loop process on each frame (frame=1 . . . END). In this stage, the detection unit 20 provides identifiers (a vehicle ID and plate IDs) to the vehicle region G11 and the license plate regions G12a and G12d to G12f detected in each frame, based on overlap between regions in frames.

Figure 4:
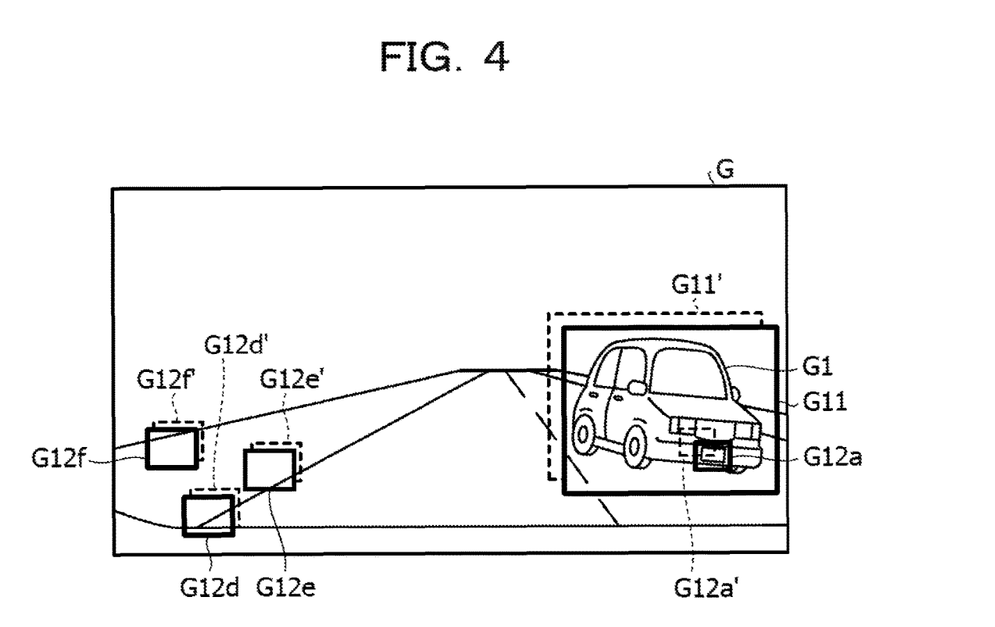
FIG. 4 is a diagram for describing a state in which images included in a moving image overlap each other.

FIG. 4 is a diagram for describing overlap between images included in the moving image G. In FIG. 4, a vehicle region G11' is a region that corresponds to the vehicle G1 and that is detected in the previous frame. Similarly, license plate regions G12a' to G12e' are license plate regions detected in the previous frame. As illustrated in FIG. 4, the same vehicle ID is provided to the vehicle regions G11 and G11' that overlap each other in frames. The same frame ID is provided to the license plate regions G12a and G12a' (The same is true for the license plate regions G12b to G12f).

Returning back to FIG. 2, the license-plate determination unit 30 performs a process of determining validity as a license plate region that is a detection target and that corresponds to a license plate disposed on a vehicle, on the detected license plate regions based on the detection results from the detection unit 20 (S17).

Figure 5:
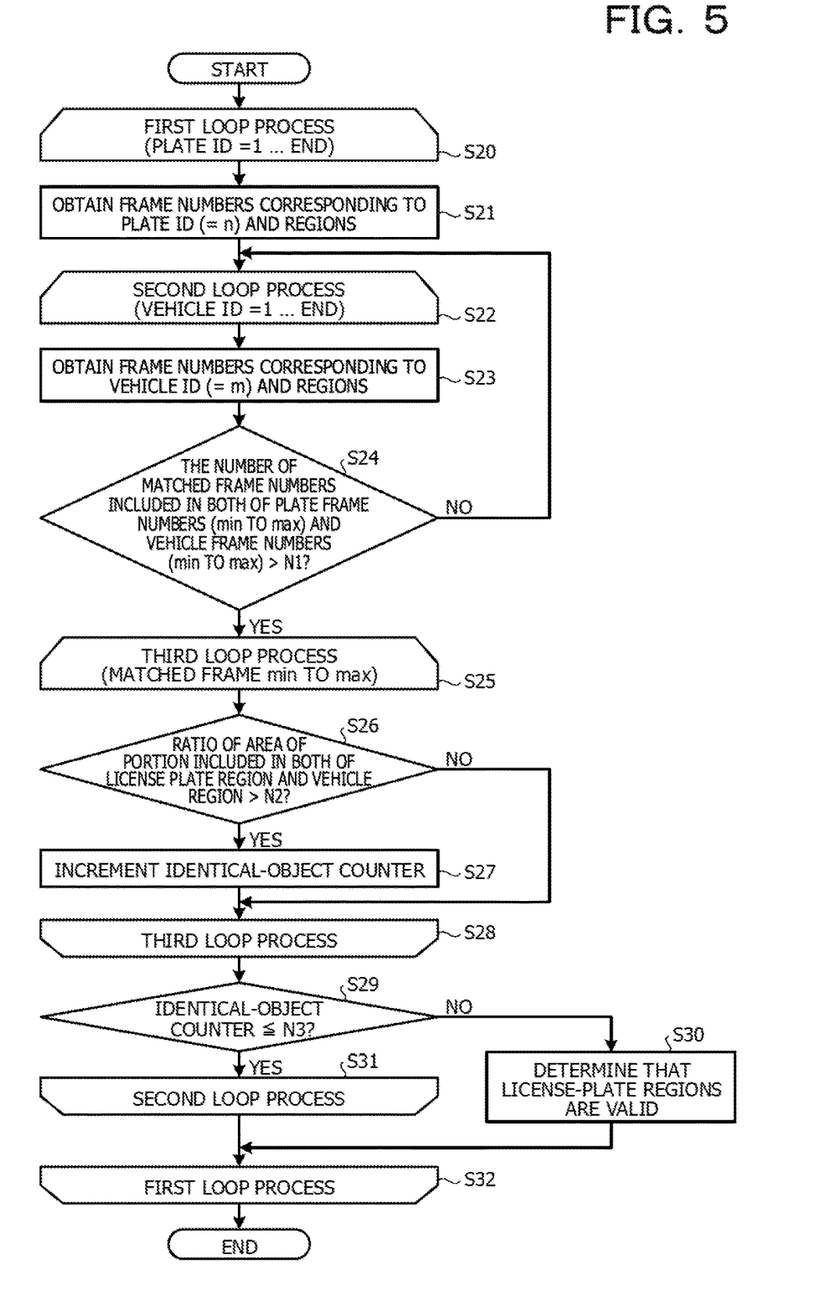
FIG. 5 is a flowchart of an exemplary license-plate validity determination process.

FIG. 5 is a flowchart illustrating an exemplary license-plate validity determination process.

As illustrated in FIG. 5, when the process starts, the license-plate determination unit 30 performs a first loop process (S20 to S32) on each set of license plate regions (plate ID=1 . . . END) detected by the detection unit 20, and determines validity of the license-plate region set.

When the first loop process starts, the second determination unit 32 obtains the frame numbers corresponding to the plate ID (=n) of a license-plate region set that is being processed in the first loop process (the frame numbers at which the license plate regions that are being processed are detected), and the regions (position information of the regions) (S21). Then, the second determination unit 32 performs a second loop process (S22 to S31) on each vehicle region set (vehicle ID=1 . . . END) that has been detected. In the second loop process, the second determination unit 32 determines license plate regions for each vehicle region set.

When the second loop process starts, the second determination unit 32 obtains the frame numbers corresponding to the vehicle ID (=m) of a vehicle region set that is being processed in the second loop process (the frame numbers at which the vehicle regions that are being processed are detected), and the regions (position information of the regions) (S23).

The second determination unit 32 obtains the number of matched frame numbers that are included in the frame numbers (min to max) for the plate obtained in S21 and that are also included in the frame numbers (min to max) for the vehicle obtained in S23. The second determination unit 32 determines whether or not the number of matched frame numbers exceeds a predetermined threshold N1 (S24). If the number of matched frame numbers does not exceed the threshold N1 (NO in S24), the second determination unit 32 returns the process back to S22.

If the number of matched frame numbers exceeds the threshold N1 (YES in S24), the second determination unit 32 performs a third loop process (S25 to S28) on each of the frames corresponding to the matched frame numbers (min to max).

When the third loop process starts, the second determination unit 32 obtains a ratio of the area of a portion which is included in the license plate region (plate ID=n) that is being processed and which is also included in the vehicle region (vehicle ID=m), with respect to the entire area of the license plate region. The second determination unit 32 determines whether or not the obtained ratio exceeds a predetermined threshold N2 (S26).

If the obtained ratio exceeds the threshold N2 (YES in S26), the second determination unit 32 increments an identical-object counter for the license-plate region set (plate ID=n) that is being processed (S27). If the obtained ratio does not exceed the threshold N2 (NO in S26), the second determination unit 32 skips S27. The identical-object counter is used to count frames from which first license plate regions are detected in vehicle regions.

Subsequently to the third loop process (S25 to S28), the second determination unit 32 determines whether or not the identical-object counter indicates a number equal to or less than a predetermined threshold N3 (S29). If the indicated number is larger than the threshold N3 (NO in S29), that is, if the number of frames in which first license plate regions are detected in vehicle regions exceeds the threshold N3, the second determination unit 32 determines that the license-plate region set (plate ID=n) that is being processed is valid (S30), and causes the process to proceed to S32 so as to continue the first loop process. If the indicated number is equal to or less than the threshold N3 (YES in S29), the second determination unit 32 causes the process to proceed to S31 so as to continue the second loop process.

In the above-described license-plate validity determination process, the license-plate determination unit 30 determines that a license-plate region set having the same plate ID is valid when a certain number of frames for license plate regions in the license-plate region set which are included in vehicle regions are present. The license-plate determination unit 30 determines that a license-plate region set having the same plate ID is not valid when a certain number of frames for license plate regions in the license-plate region set which are included in vehicle regions are not present, and excludes the license-plate region set.

Returning back to FIG. 2, the output unit 40 outputs the result, such as the plate IDs indicating the valid license-plate region sets and the position information of the regions in the moving image, based on the determination results obtained in the license-plate validity determination process (S18).

Figure 6:
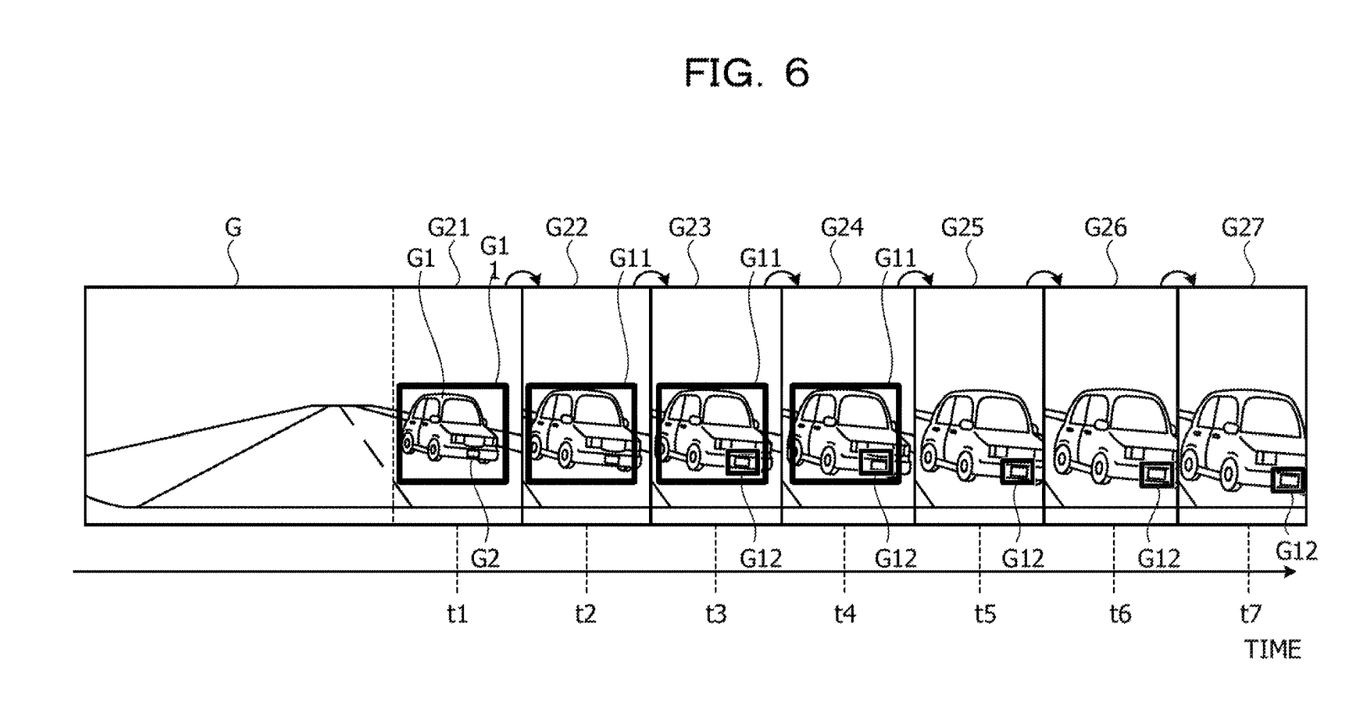
FIG. 6 is a diagram for describing a detection result.

FIG. 6 is a diagram for describing a detection result. In FIG. 6, frames G21 to G27 in which images of the vehicle G1 are captured on a right end portion of the moving image G and which are obtained at times t1 to t7 are horizontally arranged. As illustrated in FIG. 6, in the frames G21 to G24 obtained before the vehicle G1 is out of frame, the vehicle regions G11 corresponding to the vehicle G1 are detected. In the frames G23 to G27 in which the vehicle G1 approaches close enough so that the license plate G2 may be identified, the license plate regions G12 corresponding to the license plate G2 are detected. Since there are frames G23 and G24 in each of which a vehicle region G11 includes a license plate region G12, the image processing apparatus 1 may correctly detect the license plate regions G12 detected in the frames G23 to G27 as being valid ones corresponding to the vehicle G1. In addition, license plate regions that are erroneously detected due to reflection on glass, a road surface, or the like are excluded because such license plate regions do not overlap the license plate regions G12 included in the vehicle regions G11, in the frames G21 to G27. Thus, the image processing apparatus 1 may avoid erroneous detection of a license plate.

As described above, the image processing apparatus 1 includes the image acquiring unit 10 that acquires multiple images that are continuously captured. The image processing apparatus 1 also includes the detection unit 20 that detects vehicle regions and license plate regions which are included in the multiple obtained images, based on the feature values of each image included in the multiple obtained images. The image processing apparatus 1 also includes the first determination unit 31 that determines first license plate regions that are included in detected vehicle regions, among the license plate regions included in the multiple images. The image processing apparatus 1 also includes the second determination unit 32 that determines second license plate regions corresponding to the first license plate regions based on overlap with the first license plate regions in images included in the multiple images, among the license plate regions included in the multiple images. The image processing apparatus 1 also includes the output unit 40 that outputs the first license plate regions and the second license plate regions as regions that are detection targets, among the license plate regions included in the multiple images. Thus, the image processing apparatus 1 may exclude license plate regions that are erroneously detected due to reflection on glass, a road surface, or the like, achieving avoidance of erroneous detection of a license plate.

The illustrated components of the apparatus do not necessarily have the physical configuration as illustrated. That is, the specific form in which apparatuses are distributed or combined with one another is not limited to that as illustrated. All or some of the apparatuses may be configured in such a manner as to be functionally or physically distributed or combined into any unit, in accordance with various loads, the usage, and the like.

All or some of the various processing functions performed by the image processing apparatus 1 may be performed on a central processing unit (CPU) (or a microcomputer, such as a microprocessing unit (MPU) or a micro controller unit (MCU)). Needless to say, all or some of the various processing functions may be performed by using programs analyzed and executed by a CPU (or a microcomputer, such as an MPU or an MCU) or by using hardware using wired logic. The various processing functions performed by the image processing apparatus 1 may be performed through cloud computing in which multiple computers collaborate with one another.

Figure 7:
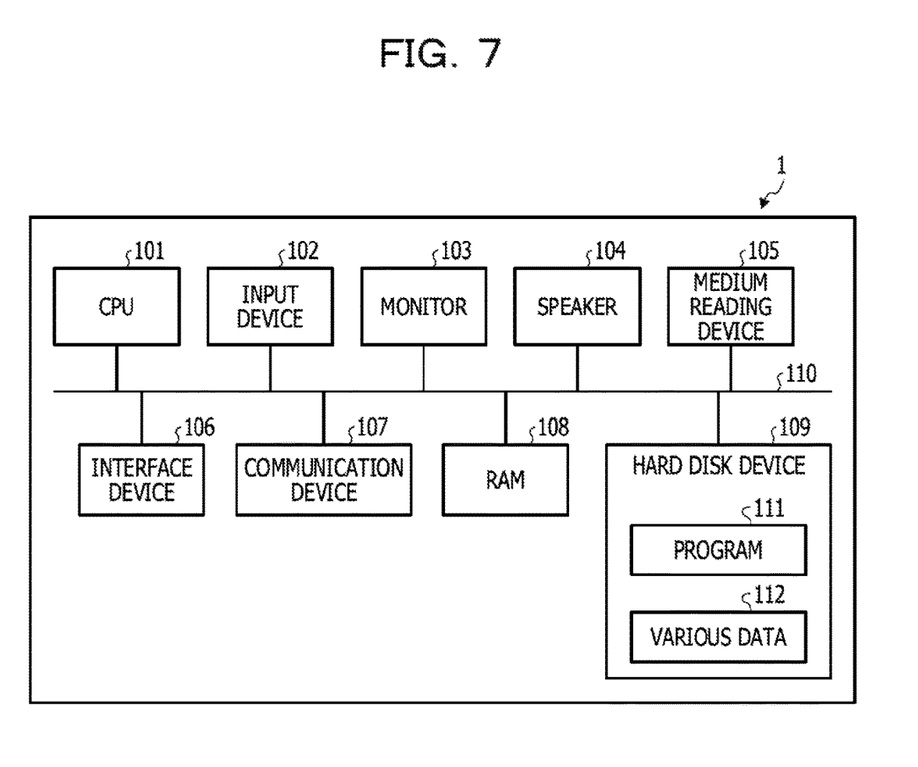
FIG. 7 is a block diagram illustrating an exemplary hardware configuration of the image processing apparatus according to the embodiment.

The various functions described in the above-described embodiment may be implemented by a computer executing programs prepared in advance. Accordingly, an exemplary computer (hardware) executing programs having substantially the same functions as those in the above-described embodiment will be described below. FIG. 7 is a block diagram illustrating the hardware configuration of the image processing apparatus 1 according to the embodiment.

As illustrated in FIG. 7, the image processing apparatus 1 includes a CPU 101 that performs various types of computing processing, an input device 102 that receives data input, a monitor 103, and a speaker 104. The image processing apparatus 1 also includes a medium reading device 105 that reads programs and the like from a storage medium, an interface device 106 for getting connected to various apparatuses, and a communication device 107 for communicating with external apparatuses in a wired or wireless manner. The image processing apparatus 1 further includes a random-access memory (RAM) 108 that is used to temporarily store various types of information and a hard disk device 109. The units (101 to 109) in the image processing apparatus 1 are connected to a bus 110.

In the hard disk device 109, a program 111 for performing the various processes performed by the image acquiring unit 10, the detection unit 20, the license-plate determination unit 30, and the output unit 40 which are described in the above-described embodiment is stored. In the hard disk device 109, various types of data 112 (such as a moving image) referred to by the program 111 are stored. The input device 102 receives, for example, input of operation information from an operator of the image processing apparatus 1. The monitor 103 displays, for example, various screens on which an operator operates. The interface device 106 is connected, for example, to a printer and the like. The communication device 107 is connected to a communication network such as a LAN, and receives/transmits various types of information from/to external apparatuses over the communication network.

The CPU 101 reads the program 111 stored in the hard disk device 109, loads the program 111 on the RAM 108, executes the program 111 so as to perform various processes. The program 111 is not necessarily stored in the hard disk device 109. For example, the program 111 stored in a storage medium that may be read by the image processing apparatus 1 may be read and executed. Examples of a storage medium that may be read by the image processing apparatus 1 include portable recording media, such as a compact disc-read-only memory (CD-ROM), a digital versatile disk (DVD), and a Universal Serial Bus (USB) memory, a semiconductor memory such as a flash memory, and a hard disk drive. The program 111 may be stored in an apparatus connected to a public network, the Internet, a LAN, or the like, and the image processing apparatus 1 may read, for execution, the program 111 from the apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method executed by a computer, the method comprising:
    obtaining a plurality of frames that are sequentially captured from a moving image;
    detecting a vehicle region having a characteristic of a vehicle from each of the plurality of frames based on feature values of the plurality of frames;
    detecting a plurality of license-plate candidate regions each of which has a characteristic of a license plate, from each of the plurality of frames based on the feature values;
    providing a same vehicle ID to the vehicle regions that overlap each other in the plurality of frames;
    providing a same plate ID to the license-plate candidate regions that overlap each other in the plurality of frames;
    determining whether or not each of the license-plate candidate regions is a first license-plate region, based on a ratio relating to the license-plate candidate region being included in the vehicle region in the frame where the same vehicle ID and the same plate ID are provided;
    outputting each of the determined first license-plate regions as a detect target region based on a number of frames including the first license-plate region of the plurality of license-plate candidate regions.

2. The method according to claim 1, further comprising:
    calculating a score corresponding to each of the license-plate candidate regions based on the feature values; and
    determining the at least one first license-plate region based on the scores when the vehicle region includes two or more license-plate candidate regions.

3. A device comprising:
    a memory; and
    a processor coupled to the memory and configured to:
        obtain a plurality of frames that are sequentially captured from a moving image,
        detect a vehicle region having a characteristic of a vehicle from each of the plurality of frames based on feature values of the plurality of frames,
        detect a plurality of license-plate candidate regions each of which has a characteristic of a license plate, from each of the plurality of frames based on the feature values,
        provide a same vehicle ID to the vehicle regions that overlap each other in the plurality of frames,
        provide a same plate ID to the license-plate candidate regions that overlap each other in the plurality of frames,
        determine whether or not each of the license-plate candidate regions is a first license-plate region, based on a ratio relating to the license-plate candidate region being included in the vehicle region in the frame where the same vehicle ID and the same plate ID are provided;
        output each of the determined first license-plate regions as a detect target region based on a number of frames including the first license-plate region of the plurality of license-plate candidate regions.

4. The device according to claim 3, wherein the processor is configured to:
    calculate a score corresponding to each of the license-plate candidate regions based on the feature values, and
    determine the at least one first license-plate region based on the scores when the vehicle region includes two or more license-plate candidate regions.

* * * * *